United States Patent [19]

Erdmannsdörfer

[11] 4,271,025

[45] Jun. 2, 1981

[54] LAYERED FILTER CARTRIDGE WITH INTERNAL BYPASS CHANNELS

[75] Inventor: Hans Erdmannsdörfer, Ludwigsburg, Fed. Rep. of Germany

[73] Assignee: Filterwerk Mann & Hummel GmbH, Ludwigshafen, Fed. Rep. of Germany

[21] Appl. No.: 115,237

[22] Filed: Jan. 25, 1980

[30] Foreign Application Priority Data

Feb. 9, 1979 [DE] Fed. Rep. of Germany ....... 2904858

[51] Int. Cl.³ .............................................. B01D 29/06
[52] U.S. Cl. ..................................... 210/487; 210/489; 210/493.2
[58] Field of Search ............... 210/483, 486, 487, 488, 210/489, 492, 493 R, 493 B, 494 R, 495, 497 R, 497 FB

[56] References Cited

U.S. PATENT DOCUMENTS 3,037,637 6/1962 Bub ..................................... 210/487
3,720,323 3/1973 Landree ........................... 210/493 B

FOREIGN PATENT DOCUMENTS 4147 11/1951 Fed. Rep. of Germany.
7708832 8/1977 Fed. Rep. of Germany.

Primary Examiner—Ivars C. Cintins
Attorney, Agent, or Firm—Joseph A. Geiger

[57] ABSTRACT

A filter cartridge for a liquid-straining filter assembly designed for a radial flow-through, the cartridge having a coiled filter body which surrounds a perforated central sleeve and is axially confined between end discs, the coiled filter body consisting of overlying layers of two axially offset strips of creped filter paper, the protruding spiral edges of the two coiled strips being glued to the end discs, while the recessed opposite edges form bypass flow gaps interconnecting the axial channel portions between the creped paper layers to form a zigzag-shaped transverse flow channel for depth-filtering action, when the entry layers of the cartridge become clogged.

6 Claims, 2 Drawing Figures

LAYERED FILTER CARTRIDGE WITH INTERNAL BYPASS CHANNELS

BACKGROUND OF THE INVENTION

1. Field of the Invention

The present invention relates to filters, and, more particularly, to a filter cartridge for a liquid-straining filter of the type which is cylindrical in shape and designed for a radial flow direction of the liquid.

2. Description of the Prior Art

From the prior art it is known to produce filter cartridges which consist of a central perforated sleeve around which are wound a number of overlying layers of creped filter paper, confined in the axial sense between two non-permeable end discs.

Filter assemblies with cartridges of this type are known as depth filters, the primary purpose of the coiled, layered structure being to utilize successive layers over the radial depth of the cartridge for the retention of solid deposits, in order to prevent the premature clogging of the peripheral entry surface of the filter cartridge. On the other hand, the filter material is to have fine pores distributed evenly over its surface, in order to remove as much as possible of the fine solid matter from the passing liquid.

Some known depth filters utilize fiber layers in their filter cartridges. These fiber layers, however, are frequently subject to a non-uniform distribution of the fiber material, in addition to the possibility of packing together in certain areas, with the result that the capacity of the filter cartridge is impaired accordingly. It has therefore become more common to utilize filter cartridges which feature a spiral coil of one or two strips of filter paper. The use of filter paper greatly facilitates the control of the pore size and pore distribution and, consequently, of the resistance of the filter paper to the liquid medium which is to be filtered.

One such depth filter is disclosed in the German Published Application C 41 47, where the filtering surface in an annular paper cartridge is increased by using one or several sheets of creped filter paper with alternating longitudinal edges connected together, the paper being wound around a central sleeve to form a spiral coil. However, this type of filter cartridge allows only axial flow-through, and it is therefore suitable only for filter assemblies which are designed for such an axial flow. Special precautions have to be taken, in order to prevent the mounting of the filter cartridge in an axially reversed orientation.

Another filter cartridge is disclosed in the German Gebrauchsmuster (Utility Model) No. 77 08 832. This solution proposes the use of a continuous web of paper fleece which is wound around a perforated central sleeve in the form of a spiral coil, to form a radially permeable body. The superposed layers of this coil have aligned longitudinal edges which abut against two metal end discs of the cartridge. This structure has the shortcoming of forcing the entire liquid flow through the outermost layer of the filter coil, so that it tends to develop premature clogging on its outer surface and its radial depth is not utilized effectively.

SUMMARY OF THE INVENTION

Underlying the present invention is the primary objective of creating an improved depth filter of the type which is described above, where the radially permeable filtering coil is provided with a superior depth-filtering capability and, consequently, with a greater capacity to retain solid matter without clogging. These improvements are to be achieved with simple means, at minimal costs.

The present invention proposes to attain this objective by suggesting a novel construction of a spiral-wound filter coil, using two laterally offset strips of filter material which are arranged in such a way that the two strips form two intermeshing spiral members with overlying coil layers formed alternatingly by one or the other spiral member. Each spiral member of the filtering coil has its axially protruding edge sealingly attached to an end disc, while its axially recessed opposite edge is spaced a distance from the opposite end disc, so that the two spiral members and their attached end discs form a series of bypass flow gaps which alternate with the attached spiral edges.

The proposed novel filter cartridge thus features a continuous annular channel of a zigzag-type cross-sectional outline, the axially oriented portions of the channel being formed between the grooves and ridges of the creped paper strip, and the radially oriented flow reversing portions of the channel being the earlier-mentioned bypass flow gaps. By changing the depth of the crepe grooves in the filtering strip and/or by varying the tension with which the strips are wound into a coil, it is further possible to produce a zigzag flow channel of changing cross-sectional opening. Thus, it becomes readily possible to coordinate the permeability of the filtering strip with the size of the flow channel between successive coil layers in such a way that the filter material becomes progressively denser over the distance from the entry surface of the coil to the outlet surface of the coil, in order to fully utilize the entire radial depth of the latter.

One of the two strips of filter material may have a different structure from the proposed creped filtering strip. Its surface may be smooth and, depending on the particular application, it may also be of a different material, such as glass paper, felt, or some other suitable filter material. Preferably, however, both strips of filter material consist of filterpaper which is creped transversely to the longitudinal direction of the strip.

It is further suggested that, for purposes of simplified production and inventory control, both strips of filter paper be fully identical, being of the same material and having the same width.

In order to secure the axially offset position of the two spiral members and attached end discs in the coil body, it is possible to locally apply a few drops of adhesive between superposed layers during the winding operation. In a preferred embodiment of the invention, the spiral members and their attached end discs are secured against each other by means of a permanent bond between the central sleeve and the two end discs.

BRIEF DESCRIPTION OF THE DRAWINGS

Further special features and advantages of the invention will become apparent from the description following below, when taken together with the accompanying drawing which illustrates, by way of example, a preferred embodiment of the invention which is represented in the various figures as follows.

DESCRIPTION OF THE PREFERRED EMBODIMENT

Figure 1:
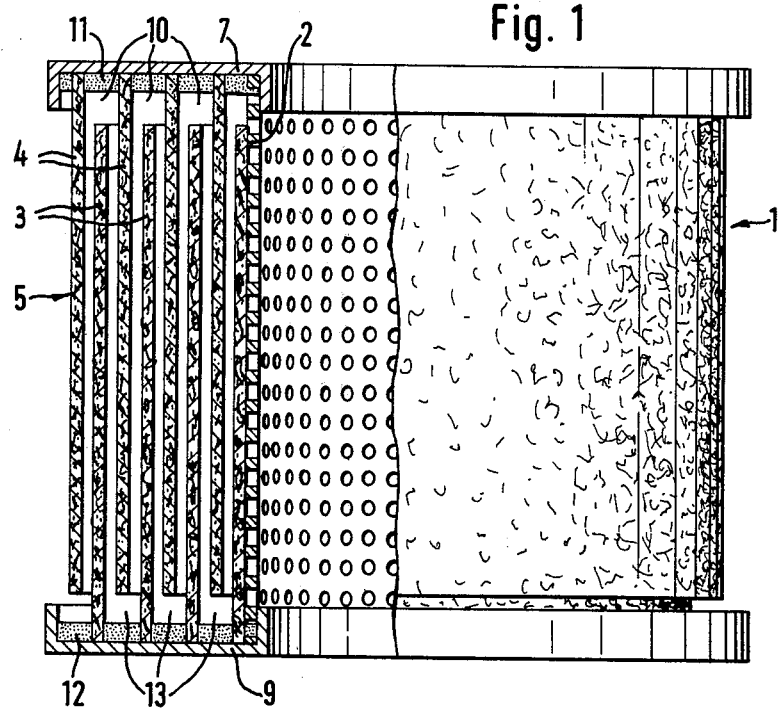
FIG. 1 is an elevational view, partially cross-sectioned, of a filter cartridge, representing an embodiment of the invention in a somewhat schematic representation.
Figure 2:
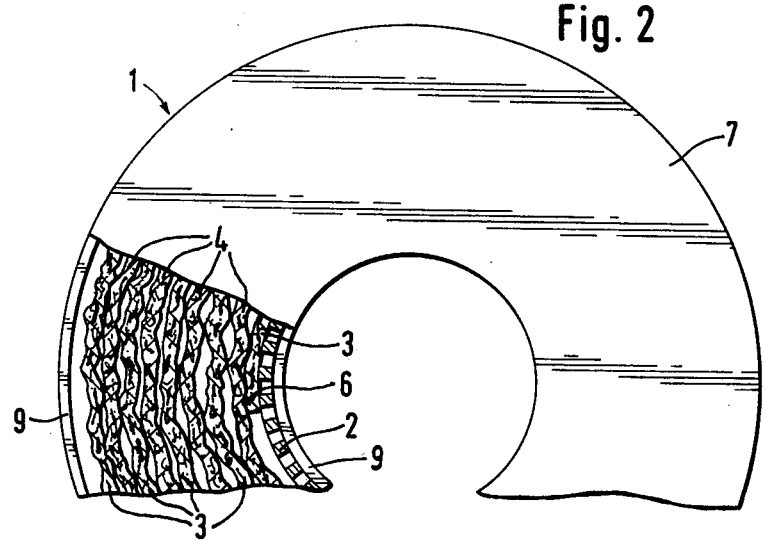
FIG. 2 is a plan view, likewise partially cross-sectioned, of the filter cartridge of FIG. 1.

FIG. 1 and FIG. 2 of the drawing show a filter cartridge 1 which features a perforated central sleeve 2 onto which are wound two overlying filtering strips 3 and 4 which thereby form a spiral coil that serves as an annular filter body 5. The two filtering strips 3 and 4 consist of identical strips of filter paper which is creped transversely to its longitudinal direction. Both strips have the same width. The inner extremities of the two filtering strips 3 and 4 are glued to the central sleeve 2, on opposite sides of the latter. The attached inner extremity 6 of the first filtering strip 3 is visible in FIG. 2. The axial extremities of the coiled filter body 5 are covered by two annular end discs 7 and 9 of identical structure which form impermeable axial extremities in the area of the coil itself, while having axially open hub portions to which the central sleeve 2 is permanently attached.

As can be seen in FIG. 1, the two filtering strips 3 and 4 overlie each other with an axial offset. This offset has the effect that the lower edge of the spiral member formed by the filtering strip 3, for example, protrudes over the lower edge of the spiral member formed by the filtering strip 4, whereas, on the upper side of the coil, the edge of the filtering strip 4 protrudes by the same distance over the edge of the filtering strip 3. The protruding spiral edges are permanently attached to their associated end discs 7 and 9 by means of two adhesive layers 11 and 12, respectively. Each adhesive layer thus seals the edge of every second layer to the associated end disc.

FIG. 1 also shows that the non-attached edges of the two spiral members are recessed to such an extent that they form bypass flow gaps 10 and 13 between them and the upper and lower end discs and adhesive layers, respectively, so that the axial flow channels which exist between adjoining layers of the filter body 5 are linked alternatingly on the upper and lower extremities of the filter body. The result is a continuous zigzag-like flow channel which greatly improves the depth-filtering action of the filter cartridge.

The adhesive layers 11 and 12 also provide a permanent attachment between the two end discs 7 and 9 and the two axial extremities of the central sleeve 2. The operative steps of attaching the end disc 7 or 9 to the central sleeve 2 and to the axially protruding spiral edges of the filtering strip 3 or 4, respectively, are preferably performed in a single assembly operation. It is advantageous to perform this assembly operation by first applying the adhesive layer to the inside of the end disc and by then imbedding the spiral edge of the coiled filter body in the adhesive layer.

In operation, the filter cartridge 1 strains a liquid which flows in the radial direction, entering on its outer periphery and exiting axially through the central opening of one of its end discs 7 or 9. Within the filter body 5 itself, the radial flow of the liquid is supplemented by a cross flow which has a zigzag outline, beginning underneath the outermost coil layer and ending at the innermost coil layer. The axial length portions of this zigzag-shaped bypass flow channel are actually constituted by a large number of adjacent flow channels which lie between the axial grooves and ridges of the superposed layers of the filtering coil.

The cross sectional opening of the flow channel and the radial permeability of the filter paper are preferably so adapted to one another and to the liquid to be filtered that the primary direction of liquid flow is radially through the filtering strips 3 and 4. It will therefore be the outermost layer of the filter body 5 which will be the first layer to be clogged by retained solid matter. As the resistance of this top layer to the passage of liquid increases, the entry of the liquid into the filtering coil will progressivley shift from the peripheral surface of the filter body 5 to the first bypass flow gap between the outermost layer and the end disc from which it is recessed, so that solid matter will be deposited on the second layer, until it, too, becomes more and more clogged and is in turn bypassed by the liquid, being forced to flow through the second bypass flow gap, around the edge of the layer which is recessed from the end disc.

This process of progressively shifting the solid-matter-retaining function to a lower coil layer makes it possible to distribute the solid matter over the entire depth of the filter body 5, so that the latter is utilized in an optimal way, providing a long-lasting effective filtering action.

While it is preferable to arrange the novel filter cartridge in such a way that the liquid to be filtered enters the filter body on its outer radial periphery and exits from its inner radial periphery, it is of course also possible to reverse this flow direction, so that the liquid enters on the inner radial periphery and exits from the outer radial periphery. In this case, however, it becomes necessary to surround the outermost layer of the filter body with a perforated support jacket. While it will now be the innermost layer of the coil which is the first to be clogged with solid matter, the depth filtering action of the cartridge is similar to that previously described, as the bypass flow channels permit the progressive shift of the liquid entry to deeper, radially more distant layers, until the entire filter body is clogged with solid matter.

It should be understood, of course, that the foregoing disclosure describes only a preferred embodiment of the invention and that it is intended to cover all changes and modifications of this example of the invention which fall within the scope of the appended claims.

I claim the following:

1. A filter cartridge for a liquid-straining filter assembly comprising in combination:
    a perforated central sleeve serving as a support member;
    first and second filtering strips overlying one another and surrounding the central sleeve in the form of two intermeshing spiral members which form a filter body with a plurality of filtering layers constituted alternatingly by one or the other filtering strip; and
    two end discs covering the axial ends of the filter body, at least one end disc having a central opening which, in cooperation with the central sleeve, forms a flow passage for a radial flow of the liquid through the filter body; and wherein
    the material of at least one filtering strip is creped transversely to its longitudinal direction so that the ridges and grooves of overlying layers form flow channel portions through which can take place an axial flow between the filtering strips;
    the intermeshing spiral members formed by the first and second filtering strips are offset from one another in the axial sense so that the spiral edge of each filtering strip protrudes axially towards one end disc while being recessed from the other; and the axially protruding spiral edges of the filtering strips are in sealing contact with the two end discs so that a continuous zigzag-shaped flow channel is formed between the overlying layers of filtering strip and the end discs and direction-reversing by-pass flow gaps are formed between the axially recessed spiral edges of the filtering strips and the end discs.

2. A filter cartridge as defined in claim 1, wherein the material of both filtering strips is transversely creped filter paper.

3. A filter cartridge as defined in claim 2, wherein the two filtering strips are of the same material and have the same width.

4. A filter cartridge as defined in one of claims 1, 2, and 3, wherein the sealing contact between the axially protruding spiral edges of the filtering strips and the end discs is in the form of an adhesive bond.

5. A filter cartridge as defined in claim 4, wherein the two end discs are permanently attached to the central sleeve.

6. A filter cartridge as defined in claim 5, wherein the two end discs are identical annular discs which are bonded to the axial extremities of the central sleeve by a layer of adhesive which also forms the bond between the end discs and the spiral edges of the filter body.

* * * * *